United States Patent Office 3,684,659
Patented Aug. 15, 1972

3,684,659
PROCESS FOR THE ENRICHMENT AND PURIFICATION OF L-ASPARAGINASE
Hans Ulrich Bergmeyer, 5a Bahnhofstrasse, 8132 Tutzing, Upper Bavaria, Germany; Wolfgang Gruber, Garatshausen 16, Germany; and Waldemar Thum, Traubinger Strasse 17a; Karlfried Gawehn, Bahnhofstrasse 5a; and Hans Möllering, 5 Waldschmidtstrasse, all of 8132 Tutzing, Upper Bavaria, Germany
No Drawing. Filed Feb. 9, 1970, Ser. No. 10,031
Claims priority, application Germany, Feb. 21, 1969, P 19 08 833.6
Int. Cl. C07g 7/028
U.S. Cl. 195—66 A     13 Claims

ABSTRACT OF THE DISCLOSURE

L-asparaginase obtained from *Escherichia coli* is enriched and purified by digesting a cell suspension of *Escherichia coli*, subsequently subjecting the digested suspension to manganese precipitation, treating the supernatant or filtrate from the manganese precipitation with a gel, and separating the gel and eluting the gel at a pH between 8.5 and 10.

---

The present invention is concerned with a process for obtaining asparaginase from *Escherichia coli* and with the purification thereof.

It is known that L-asparaginase exhibits outstanding anti-neoplastic properties and has provided, not only in animal experiments but also in humans, successful results in the treatment of leukemia and other tumors. It is assumed that the successful results of treatment already achieved can be improved still further if sufficient amounts of L-asparaginase are available since at least some of the negative treatment results can be attributed to an insufficient dosage as a result of the difficulties in obtaining the enzyme.

There is, therefore, a great interest in providing methods which enable the need for L-asparaginase to be satisfied.

H. A. Campbell et al have described in "Biochemistry," 6, 721 et seq. (1967) a purification process for L-asparaginase in which *Escherichia coli* cells are digested, the cell free extracts are subjected to a manganese precipitation, the supernatant is fractionated with ammonium sulfate and the active proteinaceous fraction obtained is chromatographed over a column of hydroxyapatite. The eluent from the column is then chromatographed over diethylaminoethyl-cellulose.

In "The Journal of Bacteriology," 95, 2117–2123 (1968), J. M. Hill et al. also described a purification process in which the *Escherichia coli* cells are digested, the digest is subjected to an ethanol fractionation, the active fraction is chromatographed over a column of diethylaminoethyl-cellulose, the active eluate precipitated with ethanol, then chromatographed over carboxymethyl-Sephadex, again precipitated with ethanol and, if desired, highly purified by polyacrylamide electrophoresis.

These known processes suffer from the disadvantage that, on the one hand, in the case of many strains of *Escherichia coli*, they do not lead to satisfactory enrichments of the desired enzyme and, on the other hand, due to the necessity of repeated column chromatography, they are very expensive from the point of view of labor and spatial requirements. Therefore, they are only of very limited utility for production on a large scale. Furthermore, we have found that the processes are not reproducible and the purity of commercial preparations obtained by means of these known processes are not entirely satisfactory.

It is, therefore, an object of the present invention to provide a process which is suitable for use on a large scale for the purification and enrichment of asparaginase from *Escherichia coli*, which process does not suffer from the above-mentioned disadvantages.

Thus, according to the present invention, there is provided a process for the enrichment and purification of L-asparaginase from *Escherichia coli* by digestion of the cells and subsequent manganese precipitation, wherein the supernatant or filtrate of the manganese precipitation is treated with a gel and the gel is then separated and thereafter eluted at a pH between 8.5 and 10.

By means of the purification step according to the present invention, there is achieved not only a purification of the enzyme but also a considerable concentration thereof so that further purification by means of any suitable process can be carried out with considerably reduced amounts of material. It is particularly surprising that with only very small amounts of gel, i.e. of 10–20%, referred to the volume of the filtrate obtained after the manganese precipitation, a practically complete adsorption and subsequent elution of the active protein can be achieved although a comparatively high salt content is present in the filtrate from the manganese precipitation, which is used for the gel stage.

The digestion of the bacterial cells takes place in known manner. Suitable methods include, for example, high pressure dispersion and the action of ethyl acetate and of surface-active materials, such as Triton X 100 or lysozyme. High pressure dispersion is, however, preferred. The manganese precipitation is also carried out in known manner. Thus, for example, for this purpose reference is directed towards the description given in the above-mentioned publication in "Biochemistry."

Gels which can be used for carrying out the process according to the present invention include inorganic gels with adsorption properties. As examples thereof, there may be mentioned calcium phosphate gel, aluminum hydroxide gel, silicic acid gel and stannic acid gel. Calcium phosphate gel is, however, preferred. The calcium phosphate concentrations in the gel are usually between 10 and 30 mg./ml., preferably between about 15 and 25 mg./ml. The gel is simply added to the supernatant from the manganese precipitation, expediently after a pre-testing, and distributed therein by stirring and thereafter left to stand.

The preceding steps, namely, the digestion of the bacterial cell paste and admixture of the cell suspension obtained with a dilute solution of manganese salt, are known. The supernatant obtained after separation of the manganese precipitate is treated with the gel and thereafter separated. After washing and separating the gel, it is eluted at a pH value between 8.5 and 10, preferably at about 9.3 to 9.7. It is hereby expedient merely to stir the washed and separated gel with a solution of the given pH value, preferably with a dilute buffer solution. The L-asparaginase hereby passes into the supernatant and can easily be separated from the gel.

The elution is preferably carried out with a buffer solution. For this purpose a 0.02 M solution of dipotassium hydrogen phosphate with a pH of 9.5 has proved to be very suitable. An elution at a pH value below 8.5 is, in principle, possible but, in this case, such high buffer or salt concentrations are necessary for the elution that a subsequent dialysis would be necessary, which is difficult to carry out on a large scale. In the case of pH values above 10, an increasing deactivation of the enzyme occurs. However, in the above-mentioned pH range of 8.5–10, more than 80% of the original activity is eluted.

The product obtained by the process according to the present invention can, if desired, be further purified by known processes. Thus, for example, an ethanol precipitation and subsequently chromatography over carboxymethyl-Sephadex can subsequently be carried out. It is also possible to carry out, in known manner, an ethanol fraction directly after the digestion of the cells, whereafter the manganese precipitation is carried out. Preferably, however, the gel eluate is subjected to an alcohol fractionation. Since the eluate has a very low salt concentration, it is possible, before the fractionation, considerably to concentrate the solution, preferably to about one-fifth to about one-seventh of its original volume. The alcohol fractionation is, according to one preferred aspect of the present invention, carried out by precipitation with isopropanol, dissolving the precipitate and precipitating again with methanol. This fractionation with isopropanol and methanol can also be carried out, instead of the ethanol fractionation, directly after the digestion of the cells. However, it is preferable to carry out the isopropanol-methanol fractionation after the gel stage.

According to an especially preferred feature of the process according to the present invention, after the gel stage and possibly after an isopropanol-methanol fractionation step, there is carried out a protamine sulfate precipitation. After separation of the protamine sulfate precipitate, the supernatant can be chromatographed over a column of diethylaminoethyl-Sephadex. The combination of a protamine sulfate precipitation with a diethylaminoethyl-Sephadex chromatography gives a very good purification and enriching effect and leads to a product, the specific activity of which corresponds substantially to that of the commercially available preparations.

The above-described additional purification steps after the elution of the gel are preferably carried out at pH values between about 6.5 and 8.5, preferably between 7 and 8. In the case of chromatography over diethylaminoethyl-dextrane gel (diethylaminoethyl-Sephadex), washing is preferably carried out with a 0.02 to 0.03 M phosphate buffer, followed by elution with 0.05 to 0.06 M phosphate buffer. The active protein is precipitated from the eluate in known manner by means of alcohol and either used as such or subjected to a known high purification, for example, by means of chromatography on carboxymethyl-dextrane gel (carboxymethyl-Sephadex).

The process according to the present invention permits a rapid and effective purification and enrichment of L-asparaginase from *Escherichia coli* to be carried out on a large scale. The process according to the present invention avoids process steps which require a substantial amount of space, time and labor, such as the chromatographing of comparatively large amounts of material. Insofar as chromatography is carried out, this only takes place at a later stage of the process where the purification is already well advanced so that it is possible to work with substantially smaller volumes of material or with the same expenditure of apparatus as was used for the previously known processes but with a substantially higher throughput rate, referred to the amount of active protein.

The following examples are given for the purpose of illustrating the present invention:

EXAMPLE 1

The cells were separated from two 500 liter culture batches of *Escherichia coli* and, without cooling, digested by high pressure dispersion. The cell suspension was made up with water to 150 liters and adjusted with dilute acetic acid to a pH of 5.8. After warming to 40° C., the material was adjusted to 0.05 M with a dilute solution of manganese acetate. The pH was readjusted and the precipitate left to stand and then separated. The precipitate was washed with water and the supernatant combined with the wash water. The combined supernatants were mixed with about 15% calcium phosphate gel (c. 20 mg./ml.) and the gel then separated. The gel was washed with water and the supernatant and wash water were discarded.

The gel was stirred with three times its volume, referred to the original gel volume, of 0.02 M dipotassium hydrogen phosphate solution with a pH of 9.5. If necessary, the pH was readjusted. After termination of the elution of the asparaginase, the gel was separted by centrifugation or filtration. The precipitated gel was homogenized and washed with water. After separating by centrifugation or filtration the gel was discarded. The supernatant of the gel elution and the wash water were then combined and contain about 80% of the original activity.

The solution thus obtained was concentrated at a pH of 7.0, with warming, to an enzyme content of about 20 mg./ml.

From the concentrate thus obtained, the enzyme can be precipitated by the addition of 1.2 volumes of ethanol. Activity: 15–20 U/mg.; yield: 58%, referred to the cell suspension supernatant.

EXAMPLE 2

The process according to Example 1 was repeated but the calcium phosphate gel eluate, after concentration, was mixed stepwise at pH 7.0 with such an amount of 90% isopropanol that less than 5% of the asparaginase activity remained in the supernatant (about 1 volume). The precipitate formed was separated off, taken up with 0.02 M buffer of pH 7.0 and precipitated stepwise with a total of about 1.15 volumes methanol at pH 7.0 and at a temperature of 10° C. The precipitate was separated off, taken up with 0.02 M potassium phosphate buffer of pH 7.6 and mixed with 10% protamine sulfate solution, until no further turbidity was produced. The precipitate was separated off and discarded. The supernatant was applied to a column of diethylaminoethyl-Sephadex equilibrated with 0.02 M phosphate buffer of pH 7.6, washed with two column volumes of 0.025 M buffer and eluted with 0.055 M phosphate buffer. The fractions which contain the L-asparaginase were combined and the enzyme was precipitated with alcohol. The precipitate had a specific enzyme activity of about 180–200 U/mg. The total yield was about 36%.

EXAMPLE 3

The procedure described in Example 2 was repeated but the precipitate of the alcohol precipitation was taken up in 0.05 M sodium acetate buffer of pH 5.0 and applied to a carboxymethyl-Sephadex column which had been equilibrated with the same buffer. The column was washed with the same buffer with the addition of 0.05 M potassium chloride and eluted with the same buffer with the addition of 0.1 M potassium chloride. The active fractions were combined, adjusted to pH 7.0 and precipitated with alcohol. The precipitate was taken up in water, again adjusted to pH 7.0 and separated from insoluble material. The enzyme crystallized out upon adding ammonium sulfate to 3.5 M. The specific activity of the enzyme was 230 U/mg. The crystallized preparation was electrophoretically uniform at pH 5 and 8.6. The total yield, referred to the activity measured on the digest, was 29%.

What is claimed is:

1. Process for the enrichment and purification of L-asparaginase obtained from *Escherichia coli* which process comprises digesting a cell suspension of *Escherichia coli*, subsequently subjecting the digested suspenion to manganese precipitation, treating the supernatant or filtrate from the manganese precipitation with an inorganic adsorptive gel, and separating the gel from the supernatant and eluting the enzyme from the gel at a pH between 8.5 and 10 with a buffer solution.

2. Process as claimed in claim 1, wherein the gel is eluted at a pH of about 9.3 to 9.7.

3. Process as claimed in claim 1, wherein the elution is carried out with a 0.02 M solution of dipotassium hydrogen phosphate at a pH of about 9.5.

4. Process as claimed in claim 1, wherein an alcohol fractionation with isopropanol and methanol is carried out before the gel treating step.

5. Process as claimed in claim 1, wherein the gel eluate is subjected to an alcohol fractionation using isopropanol and methanol.

6. Process as claimed in claim 5, wherein a protamine sulfate precipitation is carried out subsequent to the alcohol fractionation.

7. Process as claimed in claim 6, wherein the filtrate from the protamine sulfate precipitation is subjected to diethylaminoethyl-Sephadex chromatography.

8. Process as claimed in claim 5, wherein the purification steps following the gel step are carried out at a pH of 6.5 to 8.5.

9. Process as claimed in claim 8, wherein the purification steps following the gel are carried out at a pH between 7 and 8.

10. Process as claimed in claim 7, wherein the diethylaminoethyl-Sephadex is first washed with a 0.02 to 0.03 M phosphate buffer and then eluted with a 0.05 to 0.06 M phosphate buffer.

11. Process as claimed in claim 7, wherein the enzyme obtained is further purified by carboxymethyl-Sephadex chromatography.

12. Process as claimed in claim 1, wherein the enzyme is precipitated from the enzyme-containing solution obtained by means of an alcohol.

13. Process as claimed in claim 1, wherein the gel used is calcium phosphate gel, aluminum hydroxide gel, silicic acid gel or stannic acid gel.

References Cited

UNITED STATES PATENTS 3,440,142    4/1969    Teller _____ 195—66

OTHER REFERENCES

Whelan et al., Biochemistry, vol. 8 (1969), pp. 2386–2393.

Federation Proceedings Society for Experimental Biology, vol. 29 (1968), p. 586, item 2082.

LIONEL M. SHAPIRO, Primary Examiner